(12) United States Patent
Tobing et al.

(10) Patent No.: US 8,081,852 B2
(45) Date of Patent: Dec. 20, 2011

(54) TWO-RING OPTICAL BUFFER

(75) Inventors: Landobasa Yosef Mario A. L. Tobing, Singapore (SG); Ting Mei, Singapore (SG); Mee Koy Chin, Singapore (SG); Ooi Kwen Ong, legal representative, Singapore (SG)

(73) Assignee: Nanyang Technological University, Singapore (SG)

( * ) Notice: Subject to any disclaimer, the term of this patent is extended or adjusted under 35 U.S.C. 154(b) by 183 days.

(21) Appl. No.: 12/357,325

(22) Filed: Jan. 21, 2009

(65) Prior Publication Data

US 2010/0183259 A1 Jul. 22, 2010

(51) Int. Cl.
*G02B 6/26* (2006.01)
(52) U.S. Cl. ............... 385/50; 385/15; 385/39; 385/53; 385/55
(58) Field of Classification Search .................. 385/15, 385/39, 50, 53, 55
See application file for complete search history.

(56) References Cited

U.S. PATENT DOCUMENTS 5,369,383 A * 11/1994 Takahashi et al. ............ 333/204
7,106,917 B2 * 9/2006 Painter et al. ..................... 385/2

OTHER PUBLICATIONS

Landobasa Yosef Mario et al., "Proposal for an Ultranarrow Passband Using Two Coupled Rings," IEEE Phototonics Technology Letters, Oct. 15, 2007, pp. 1688-1690, vol. 19, No. 20, IEEE, 2007.
Landobasa Yosef Mario et al., "Optical buffer with higher delay-bandwidth product in a two-ring system," Optics Express, Feb. 4, 2008, pp. 1796-1807, vol. 16, No. 3.
Fengnian Xia et al., "Ultracompact optical buffers on a silicon chip," Nature Photonics, Jan. 2007, pp. 65-71, vol. 1, Jan. 2007, Nature Publishing Group, 2007.

* cited by examiner

*Primary Examiner* — Jennifer Doan
(74) *Attorney, Agent, or Firm* — SNR Denton US LLP

(57) ABSTRACT

A two-ring optical buffer comprising a first ring operatively connected to a waveguide and a second ring, the second ring being operatively connected to only the first ring, the second ring and the first ring having a circumferential ratio substantially equal to $2^m$, where m is an integer. A ratio of resonance splitting over resonance broadening may be approximately 0.6.

16 Claims, 7 Drawing Sheets

TWO-RING OPTICAL BUFFER

TECHNICAL FIELD

This invention relates to a two-ring optical buffer and refers particularly, though not exclusively, to a two-ring optical buffer where the first ring is operatively connected to a waveguide and the second ring, and the second ring is operatively connected to only the first ring, the second ring and the first ring having a circumferential ratio substantially equal to $2^m$, where m is an integer.

BACKGROUND

An optical buffer stores and holds an optical data stream for a fixed duration without conversion to electrical format, an important role in all-optical information processing. In order to perform buffering on chip in a small footprint, a great reduction in group velocity is necessary. Slow light schemes have been proposed using both optical and electronic resonances. Optically, the forward propagation of light is delayed by circulating it through many round trips in a resonator, which may be in the form of a ring resonator or as a defect mode in photonic crystal. This delay can be extended by simply cascading many resonators together, as in coupled resonator optical waveguides (CROW) and side-coupled ring resonator structures that generally employ more than 10 cavities. Electronically, the group velocity is greatly reduced by means of electromagnetically induced transparency (EIT), which is the result of destructive quantum interference between two coherently coupled atomic energy levels. A very large delay, but associated with a very narrow bandwidth, has been demonstrated experimentally at very low temperatures. Such a remarkable phenomenon causes a growing interest in optically mimicking EIT using two coupled resonators, whose coupled resonances resemble the two energy levels in an atom, but without the limitation of low temperature which has been a major hurdle for electronic resonance. This method is interesting because it is a relatively simple configuration that can produce a large delay.

Ideally, an optical buffer should have not only a large delay, but the delay should be constant over a broad bandwidth with low insertion loss. However, causality dictates that there is a constant delay-bandwidth product determined by the physical mechanism underlying the delay. The delay-bandwidth product is a measure of the number of bits that can be stored in the buffer ($N_{ST}$). For buffers based on resonators the delay-bandwidth product is typically less than one. For example, in the simplest configuration of an all-pass filter (APF) which consists simply of one ring coupled to one bus, the delay-bandwidth product is given by $$N_{ST}^{(APF)} = \tau \Delta f = (1+r)/\pi \sqrt{r} \approx 2/\pi < 1, \qquad (1)$$

where $\Delta f$ is the normalized full-width half-maximum (FWHM), $\tau$ is the maximum delay at the resonance, and r is the coupling coefficient between the waveguide and the ring. Note that here FWHM is used only for convenience, and the usable bandwidth is actually less than that due to the presence of higher order dispersion, thereby reducing the $N_{ST}$. In the case of 56 APF, for example, the system should be able to buffer $56 \times 2/\pi = 35$ bits based on FWHM, but in reality it only buffers undistorted 10 bits which means the usable bandwidth is actually smaller.

Simply cascading the resonators does not necessarily increase $N_{ST}$. For example, the delay-bandwidth product of a CROW structure theoretically is given by $N_{ST} \cong N/2\pi$, where N is the number of resonators. However, experimentally a CROW with N=100 has only achieved undistorted buffering for one bit. This is because while the delay is increased N-fold by using N resonators, the delay-bandwidth product remains about the same as that for a single ring since the pass-band also has a ripple profile with N peaks which inevitably imposes severe distortions in the signal and effectively diminishes the operating bandwidth by 1/N. The ripple, however, can be removed when the waveguide loss is high or when the coupling between the bus waveguide and the ring is different from that between the rings. This has been demonstrated where a delay of ~110 ps combined with ~17 GHz bandwidth is achieved with 12 coupled rings and a waveguide loss of ~17 dB/cm. This corresponds to $N_{ST}$ of 1.87, which is close to the value of $(12/2\pi)=1.9$ given by the theoretical estimate. This larger $N_{ST}$, however, is compromised by a high insertion loss of about 30 dB.

SUMMARY

According to an exemplary aspect there is provided a two-ring optical buffer comprising a first ring operatively connected to a waveguide and a second ring, the second ring being operatively connected to only the first ring, the second ring and the first ring having a circumferential ratio substantially equal to $2^m$, where m is an integer.

According to another exemplary aspect there is provided a two-ring optical buffer comprising a first ring operatively connected to a waveguide and a second ring, the second ring being operatively connected to only the first ring, a ratio of resonance splitting over resonance broadening being approximately 0.6.

For the first exemplary aspect a ratio of resonance splitting over resonance broadening may be approximately 0.6. A coupling length of the first ring and the waveguide may control resonance broadening and a coupling length of the first ring and the second ring may control resonance splitting.

For both aspects resonance splitting may be controllable by the coupling length of the first ring and the second ring and resonance broadening may be controllable by a coupling length of the first ring and the optical waveguide. The two-ring optical buffer may comprise indistinguishable split resonances in the first ring and the second ring. The resonance splitting and the resonance broadening may be able to be independently controlled without changing or effecting other parameters. A delay induced by the two-ring optical buffer may be independent of the circumferential ratio.

According to a further exemplary aspect there is provided a two-ring optical buffer comprising a first ring operatively connected to a waveguide and a second ring, the second ring being operatively connected to only the first ring, the second ring and the first ring having a circumferential ratio substantially equal to $2^m$, where m is an integer; a ratio of resonance splitting over resonance broadening is approximately 0.6; resonance broadening being controllable by a coupling length of the first ring and the wave guide and resonance splitting is controllable by a coupling length of the first ring and the second ring; the resonance splitting and the resonance broadening being able to be independently controlled without changing or effecting other parameters; and a delay induced by the two-ring optical buffer is independent of the circumferential ratio.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings.

DETAILED DESCRIPTION OF THE EXEMPLARY EMBODIMENTS

Figure 1:
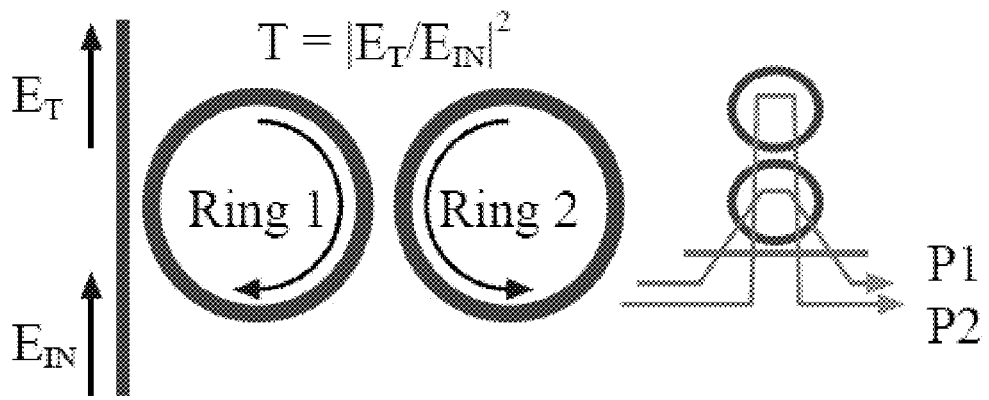
FIG. 1 is a schematic representation of an exemplary embodiment of a two-ring, one-waveguide structure.

FIG. 1 shows a schematic representation of a two-ring, one-waveguide buffer with two mutually coupled rings being a first ring R1 and a second ring R2. First ring R1 is coupled to the waveguide bus and the second ring R2 is only coupled to the first ring R1. The second ring R2 is not coupled to a waveguide. The excited optical pathways are shown in the right inset.

Figure 3:
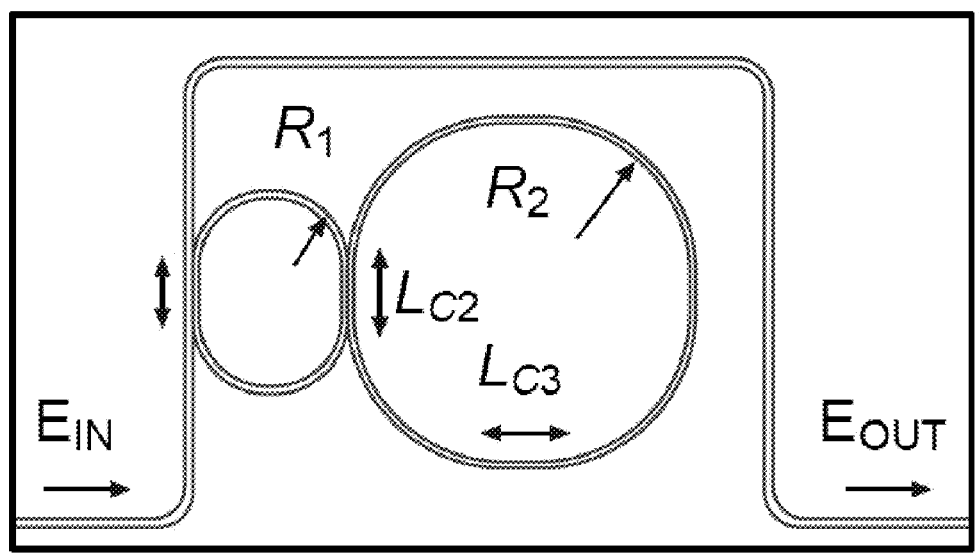
FIG. 3 is a micrograph image of the two-ring, one-waveguide of FIG. 1.

The optical buffer of FIGS. 1 and 3 has a ratio (γ), of the circumferential length of the second ring R2 to the first ring R1 of $\gamma=2^m$, where m is an integer. Also, the ratio of the resonance splitting over the resonance broadening (Ω/Γ) should be approximately 0.6. That is, Ω/Γ~0.6. Furthermore, the buffer should work in the strong coupling region. The splitting (Ω) is controlled by the coupling between the two rings R1 and R2. The broadening (Γ) is controlled by the coupling of the first ring R1 to the waveguide. Hence, there is an independent control of both parameters (Ω and Γ). Each of the splitting and the broadening is able to be independently controlled, without changing or effecting other parameters. As the buffer also works in the strong coupling region the coupling can be more precisely controlled compared to a weaker coupling.

Referring to FIG. 3, the circumferential length of the first ring is: $L_1=2(L_{C1}+\pi R_1)$. The circumferential length of the second ring is: $L_2=2(\pi R_2+L_{C2}+L_{C3})$. As the ratio (γ) of the circumferential lengths of the two rings is $2^m$, where m is an integer, when m=1 gives the least required γ for the buffer to work. Thus, $\gamma=L_2/L_1=2$.

The broadening (Γ) and the splitting (Ω) can be independently controlled by adjusting the coupler length $L_{C1}$ and $L_{C2}$ respectively. $L_{C1}$ controls the coupling between the first ring R1 and the waveguide, while $L_{C2}$ controls the coupling between the two rings R1 and R2. The achieving of Ω/Γ~0.6 is easier when γ is substantially 2, because it works in strong coupling.

As the extension parameter $L_{C3}$ is used to match γ=2, the design is more flexible.

The two-ring buffer as shown in FIGS. 1 and 3 can exhibit a theoretical delay-bandwidth product of 4/π (greater than 1) and a low insertion loss. One module of a two-ring buffer has a delay and an insertion loss comparable to 10 module CROW buffer.

The two-ring buffer is schematically shown in FIGS. 1 and 3. The transmittance of the two-ring system is similar to that of one ring coupled to one bus, and can be expressed as:

$$T = \left|\frac{E_T}{E_{IN}}\right|^2 = \left|\frac{r_1 - a_1\tau_{21}\exp(-i\delta_1)}{1 - a_1 r_1 \tau_{21}\exp(-i\delta_1)}\right|^2, \quad (2)$$

where $$\tau_{21} = |\tau_{21}|\exp(i\theta_{21}) = \frac{r_2 - a_2\exp(-i\delta_2)}{1 - a_2 r_2 \exp(-i\delta_2)} \quad (3)$$

is the embedded one-ring-one-bus transmission that incorporates the loading effect of ring 2 on ring 1. The $r_1$ and $r_2$ are, respectively, the coupling between ring 1 and the bus waveguide and that between the rings, $\delta_j=\omega T_j=\omega n_{eff}L_j/c$ is the round trip phase of ring j with effective index $n_{eff}$, cavity length $L_j$, and round trip time $T_j$, and finally $$a_j = \exp\left(-\frac{1}{2}\alpha L_j\right)$$

is the round trip amplitude loss in ring j with absorption coefficient α. Eq. 2 can be reduced to the single-ring form $$T \equiv |\sqrt{T}\exp(i\theta)|^2 = \left|\frac{r_1 - a\exp(-i\delta)}{1 - ar_1\exp(-i\delta)}\right|^2, \quad (4)$$

where $$\theta = \tan^{-1}\left(\frac{ar_1\sin\delta}{1 - ar_1\cos\delta}\right) - \tan^{-1}\left(\frac{a\sin\delta}{r_1 - a\cos\delta}\right) \quad (5)$$

is the phase response of the complex transmission, $$\delta = \delta_1 - \theta_{21} = \delta_1 - \left[\tan^{-1}\left(\frac{a_2\sin\delta_2}{r_2 - a_2\cos\delta_2}\right) - \tan^{-1}\left(\frac{a_2 r_2\sin\delta_2}{1 - a_2 r_2\cos\delta_2}\right)\right] \quad (6)$$

is the modified round trip phase, and $a=a_1|\tau_{21}|$ is the effective loss. Note that δ is the phase difference between two optical pathways, one of which is resonant in ring 1 (P1) and the other in ring 2 (P2), as illustrated in FIG. 1. When these two pathways destructively interfere, which is for odd-integer multiple of δ/π, there is no light localization in both rings and the transmission is at maximum. At constructive interference, or even-integer multiples of δ/π, the transmission is minimum and the light is localized within the two rings in a ratio depending on the relative size between the two rings $\gamma=\delta_2/\delta_1$. The group delay $\tau_D=(\partial\theta/\partial\omega)=(\partial\theta/\partial\delta_1)T_1$, in the lossless case is given by $$\tau_D = \left(\frac{1-r_1^2}{1+r_1^2-2r_1\cos\delta}\right)\left(1+\gamma\frac{1-r_2^2}{1+r_2^2-2r_2\cos\delta_2}\right)T_1 \equiv B_1(1+\gamma B_{21})T_1, \quad (7)$$

The delay is proportional to the intensity buildup factor in ring 1, $B_1$, and the relative buildup factor in ring 2 with respect to ring 1, $B_{21}$, which are defined in Eq. 7.

Figure 2:
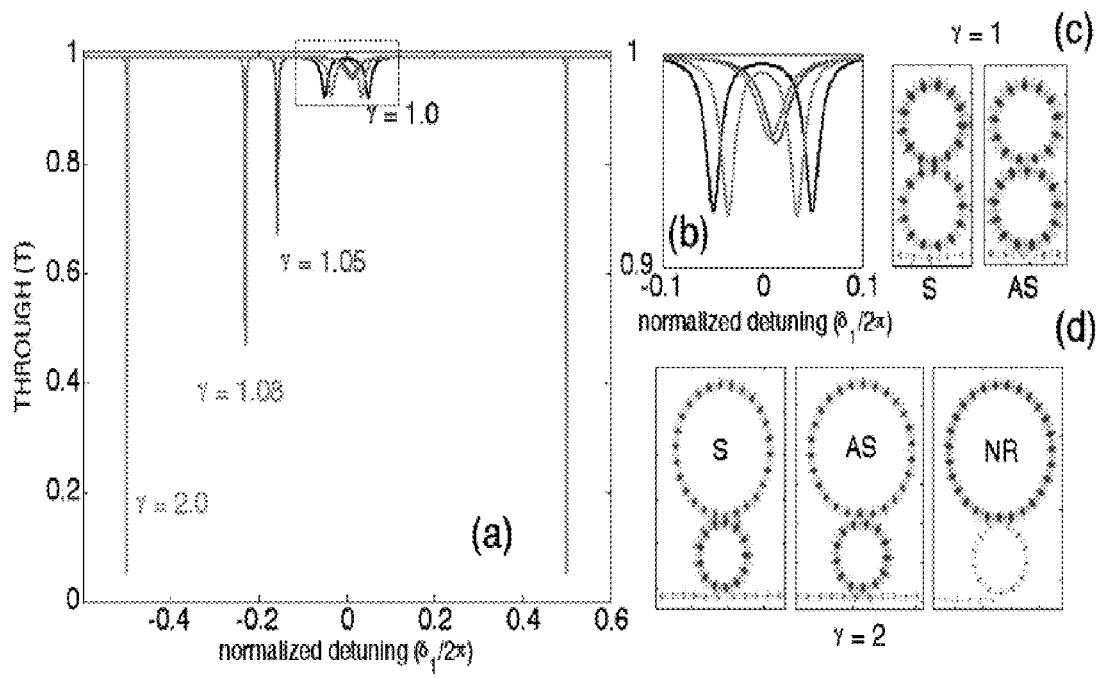
FIG. 2 is graphs of (a) the transmission spectra for γ values varying from 1 to 2 for the exemplary embodiment of FIG. 1, (b) a close-up of the boxed area near $\delta_1$=0, (c) the FDTD-simulated field distributions for γ=1, and (d) γ=2, where S, AS, and NR denote the symmetric, anti-symmetric and narrow resonance, respectively.

Generally, the transmission characteristic is similar to that in which a two-ring system is coupled to two waveguide buses. FIG. 2(a) shows the transmission spectra for various $\gamma$ values. When the rings are identical ($\gamma=1$), the light is equally distributed in both rings and the resonances evenly split. The field distributions for the resonances, shown in FIG. 2(c), show a symmetric (S) and an anti-symmetric (AS) field profiles at the coupling point. As $\gamma$ departs from 1, the resonance splitting becomes uneven and further apart, with the broader resonance associated with stronger light confinement in ring 1 and the narrower resonance associated with ring 2. With an increasing $\gamma$, the transmission also becomes progressively lower because of longer latency in the ring and therefore higher effective loss.

A particular case of interest is where $\gamma=2$, when the two resonances are the farthest apart and the narrow resonance is located at the anti-resonance of ring 1, which is at odd values of $\delta_1/\pi$. Because of this, light is mostly localized in ring 2 which is completely isolated from the bus waveguide, and the narrow resonance has the highest possible finesse (cavity lifetime). When ring 1 is resonant, so is ring 2, hence there is a symmetric splitting at even values of $\delta_1/\pi$, similar to that for $\gamma=1$, but with the light intensity approximately twice larger in ring 1 than in ring 2. The field distributions for each of the resonances are shown in FIG. 2(d). The finesse enhancement is proportional to the intensity build-up factor in ring 2, and implies that the delay is also increased correspondingly. However, the delay-bandwidth is not enhanced by such simplistic increase of finesse. Indeed, the simple $\gamma=2$ two-ring scheme based on the narrow resonance has worse buffer performance compared to the APF scheme because it has the same $N_{ST}(<1)$ but lower transparency.

Since the objective is to increase $N_{ST}$, it is proposed to make use of the two symmetrically split resonances of the two-ring structure where the transparency is higher, in order to form a reasonably flat delay with a larger delay bandwidth product (although the delay may be smaller). This can be achieved by controlling the splitting and the broadening of the resonances. In the vicinity of the split resonance, the absorbance $A=1-T$, can be expressed in the form $A=(1-a^2)B_1$ (see below for the detailed derivation), where $$B_1 = \frac{[\delta_1^2 + (\Delta_2/2\gamma)^2]B_1(0)}{[\delta_1^2 + (\Delta_2/2\gamma)^2] + \frac{4}{\Gamma^2}[\delta_1^2 - (\Omega_\gamma/2)^2]^2}, \quad (8)$$

is a split-Lorentzian function. $B_1(0)=(1-r^2)/(1-a_1r_1)^2$ is the maximum value of $B_1$, $\Delta_m=2(1-a_m r_m)/\sqrt{a_m r_m}$ is the resonance line-width of ring m, $\Gamma=\Delta_1\sqrt{a_2 r_2}$ is the total decay rate from both resonators, and $\Omega_\gamma=\delta_1^+-\delta_1^-$ is the resonance splitting which depends on $\gamma$:

$$\Omega_1 = 2\cos^{-1}(r_2), \; \Omega_2 = 2\cos^{-1}\left[\frac{1}{2}(1+r_2)\right]. \quad (9)$$

Equation (9) shows that the splitting depends only on the coupling factor between the two rings, and is generally smaller for $\gamma=2$. As $a_2 r_2$ is typically close to 1, the total decay rate $\Gamma$ is mainly dependent on $a_1 r_1$ in ring 1 and weakly dependent on ring 2.

Equation (9) may be derived from FIG. 1 as it can be shown that the resonance condition for the bare two-ring structure is:

$$\exp(i\delta_n)=\tau_{mn}=[r_2-\exp(-i\delta_m)]/[1-r_2\exp(-i\delta_m)], \quad (A1)$$

where the rings are assumed to be lossless and $\tau_{mn}$ represents the loading factor of ring m on ring n. By matching the real and imaginary components of (A1), we can come to the characteristics equation for arbitrary $\gamma$ $$\cos\left[\frac{1}{2}(\gamma+1)\delta_1\right] = r_2\cos\left[\frac{1}{2}(\gamma-1)\delta_1\right]. \quad (A2)$$

For $\gamma=1$, the two resonances are located at $\delta_1^\pm=\pm\cos^{-1}(r_2)$, thus the splitting is given by $$\Omega_1=\delta_1^+-\delta_1^-=2\cos^{-1}(r_2). \quad (A3)$$

For $\gamma=2$, by using the trigonometric identities $\cos 3x=4\cos^3 x-3\cos x$ and $\cos 2x=2\cos^2 x-1$, (A2) can be transformed to $$\cos\left(\frac{1}{2}\delta_1\right)[2\cos\delta_1 - (1+r_2)] = 0,$$

which has three roots:

$$\delta_1^{(NR)} = (2m+1)\pi, \; \delta_1^\pm = \pm\cos^{-1}\left[\frac{1}{2}(1+r_2)\right]. \quad (A4)$$

Two of these corresponds to the symmetrically split resonances around the $\delta_1=2m\pi$, giving the splitting as $$\Omega_2 = 2\cos^{-1}\left[\frac{1}{2}(1+r_2)\right], \quad (A5)$$

while the third root corresponds to a much narrower resonance situated in $\delta_1=(2m+1)\pi$, which is the NR in FIG. 2(d).

The derivation of Eq. 8 is: The intensity buildup factor in ring 1, as defined in Equation 7, is in the presence of loss given by $$B_1 = \frac{(1-r_1^2)}{(1-a_1r_1)^2 + 4a_1r_1\sin^2\delta/2}, \quad (B1)$$

where $\delta=\pi+\delta_1+\delta_2+2\tan^{-1}[r_2\sin\delta_2/(1-r_2\cos\delta_2)]$. The ring 2 is assumed lossless for a moment, because the shape of $\theta_{21}$ is almost unaffected in the presence of low loss. Using trigonometric rules, it can be shown that $$\sin^2\frac{\delta}{2} = \frac{[\cos(\gamma+1)\delta_1/2 - r_2\cos(\gamma-1)\delta_1/2]^2}{1 + r_2^2 - 2r_2\cos\delta_2}. \quad (B2)$$

By inserting (B2) in (B1) and with the high-finesse approximation, $$\cos\delta_2 \cong 1 - \frac{1}{2}\delta_2^2,$$

(B1) can be expressed as $$B_1 \cong \frac{(1-r_1^2)/(1-a_1r_1)^2}{1 + \frac{4a_1r_1/r_2}{(1-a_1r_1)^2}\frac{\left(\cos\frac{1}{2}(\gamma+1)\delta_1 - r_2\cos\frac{1}{2}(\gamma-1)\delta_1\right)^2}{(1-r_2)^2/r_2 + \delta_2^2}}. \quad (B3)$$

The effect of loss in ring 2 is then reintroduced by substituting $r_2 \to a_2r_2$ in (B3), and by approximating $$\cos\delta_1 \cong 1 - \frac{1}{2}\delta_1^2$$

and using the identity $$\cos\frac{3}{2}\delta_1 = 4\cos^3\frac{1}{2}\delta_1 - 3\cos\frac{1}{2}\delta_1$$

(for $\gamma=2$), the case of $\gamma=1$ and $\gamma=2$ in (B3) becomes $$B_{1,\gamma=1} = \quad (B4)$$

$$\frac{B_1(0)}{1 + \frac{4}{\Delta_1^2 a_2 r_2}\frac{(\cos\delta_1 - r_2)^2}{\delta_2^2 + (\Delta_2/2)^2}} \cong \frac{(\delta_1^2 + (\Delta_2/2)^2)B_1(0)}{[\delta_1^2 + (\Delta_2/2)^2] + \frac{4}{\Gamma^2}[\delta_1^2 - (\Omega_1/2)^2]^2}$$

$$B_{1,\gamma=2} = \frac{B_1(0)}{1 + \frac{4\cos^2\delta_1/2}{\Delta_1^2 a_2 r_2}\frac{(2\cos\delta_1 - (1+r_2))^2}{\gamma^2\delta_1^2 + (\Delta_2/2)^2}} \cong$$

$$\frac{(\delta_1^2 + (\Delta_2/2\gamma)^2)B_1(0)}{[\delta_1^2 + (\Delta_2/2\gamma)^2] + \frac{4}{\Gamma^2}[\delta_1^2 - (\Omega_2/2)^2]^2}$$

where both $\Omega_1$ and $\Omega_2$ are resonance splitting as derived in [025] and [027], $\Gamma = \Delta_1\sqrt{a_2r_2}$ is the total cavity decay rate, and $\Delta_m = 2(1-a_mr_m)/\sqrt{a_mr_m}$ is the resonance line-width of the $m^{th}$ ring.

The field distribution at the split resonances is proportional to the relative intensity buildup factor of ring 2 with respect to ring 1, $B_{21}(\delta_1^\pm)$. For $\gamma=1$, the $B_{21}(\delta_1^\pm)=1$, this means the light is equally confined in both rings. For $\gamma=2$, $B_{21}(\delta_1^\pm) \sim \frac{1}{2}$ for very weak inter-resonator coupling ($r_2 \sim 1$), implying that the light is about twice more localized in ring 1 than in ring 2. These facts are verified by the FDTD simulations in FIG. 2.

Figure 4:
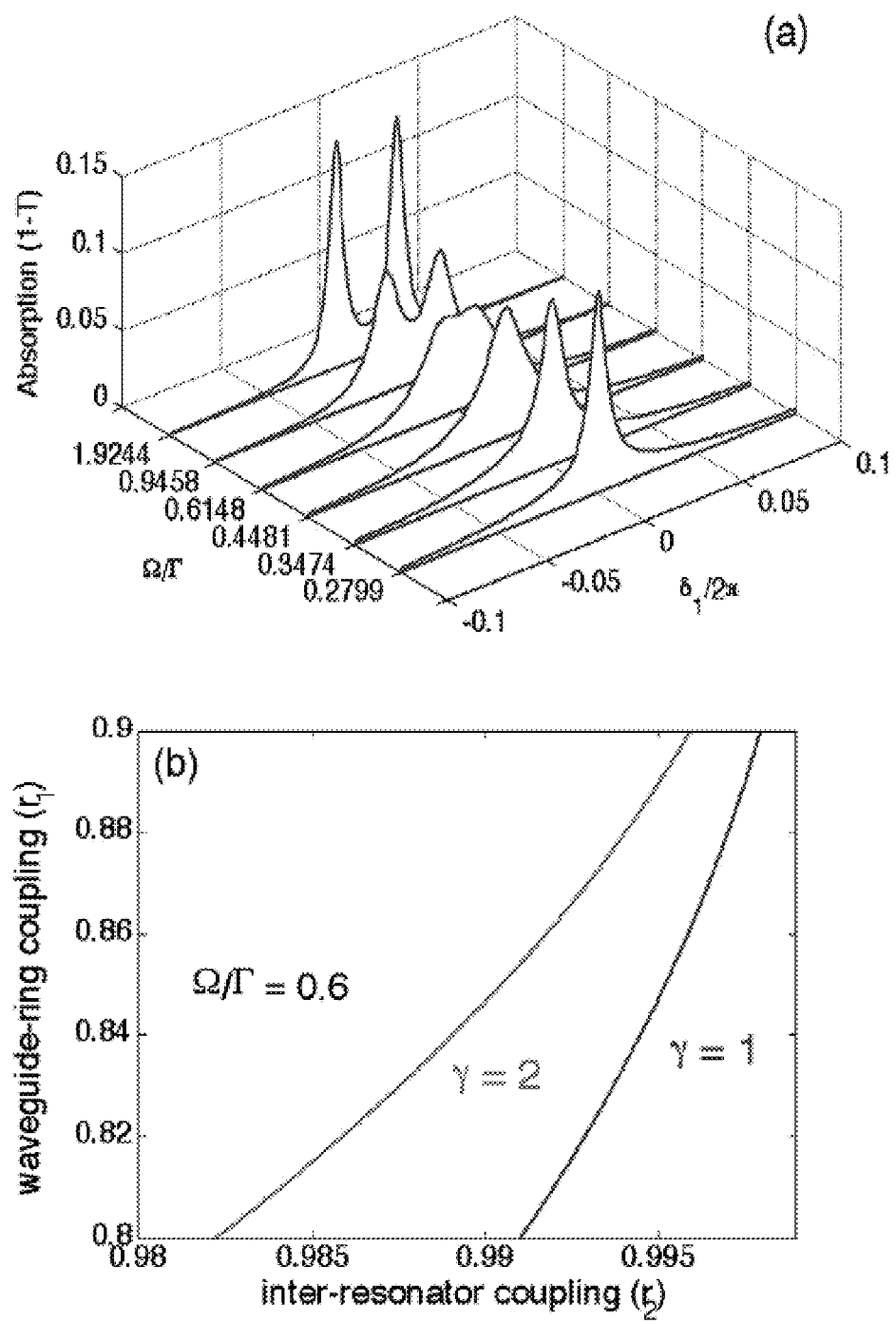
FIG. 4 is graphs of (a) the absorbance spectrum, and (b) the combinations of ($r_1$, $r_2$) required to achieve the criterion Ω/Γ~0.6.

In FIG. 4 in all cases, $a_1=0.999$. FIG. 4(a) shows the absorbance near the ring 1 resonance for different values of $r_1$ and a fixed value of $r_2$ (i.e., a fixed $\Omega$). When $\Omega/\Gamma>0.6$, the splitting dominates and there are two distinct resonances. When $\Omega/\Gamma<0.6$, the two resonances merge into one. When $\Omega/\Gamma\sim0.6$, a broad resonance with minimum insertion loss is obtained. This offers the optimal condition for the buffer and the criterion $\Omega/\Gamma=0.6$ can be achieved by various combinations of $(r_1,r_2)$ for $\gamma=1$ and $\gamma=2$, as shown in FIG. 4(b). For $\gamma=1$, the required $r_2$ value is generally very high (i.e., $r_2>0.99$ for $r_1>0.8$). Such situation ($r_2>0.99$) is practically difficult to control as it is highly sensitive to the gap separation between the waveguides. Moreover, the coupling between rings could induce a shift in the resonance wavelength of the neighboring resonator, which makes fabrication optimization more complex. In the case of $\gamma=2$, the requirement for $r_2$ is more relaxed, and the $\Omega/\Gamma\sim0.6$ can be achieved when $r_2<0.99$, which is easier to control practically. Difficulty in $\gamma=1$ is because the resonance splitting ($\Omega$) has to be very small to meet $\Omega/\Gamma\sim0.6$. In $\gamma=2$, the resonance splitting ($\Omega$) is smaller than that of $\gamma=1$, therefore relaxing the requirement to achieve $\Omega/\Gamma\sim0.6$. Furthermore, the shift of resonance wavelength due to the coupling between rings in $\gamma=2$ is not as severe as in the case of $\gamma=1$. This is an added advantage of using $\gamma=2$.

Using Equations 7 and 8, the maximum delay is shown to be $$\tau_D/T_1 \cong [4r_1/(1+r_1)^2](\Gamma/\Omega)^2 B_1(0), \quad (10)$$

where that $r_2 \sim 1$ is assumed for both $\gamma=1$ and $\gamma=2$. The delay is independent of $\gamma$. Using the criterion $\Omega/\Gamma\sim0.6$, the delay for the two-ring system is almost $3B_1(0)$, or equivalent to 3 modules of APF with the same coupling parameters, for which $\tau_D/T_1=B_1(0)$. However, the FWHM bandwidth is somewhat smaller than the APF, giving rise to a net increase in the delay-bandwidth product by a factor of about 2.

Figure 5:
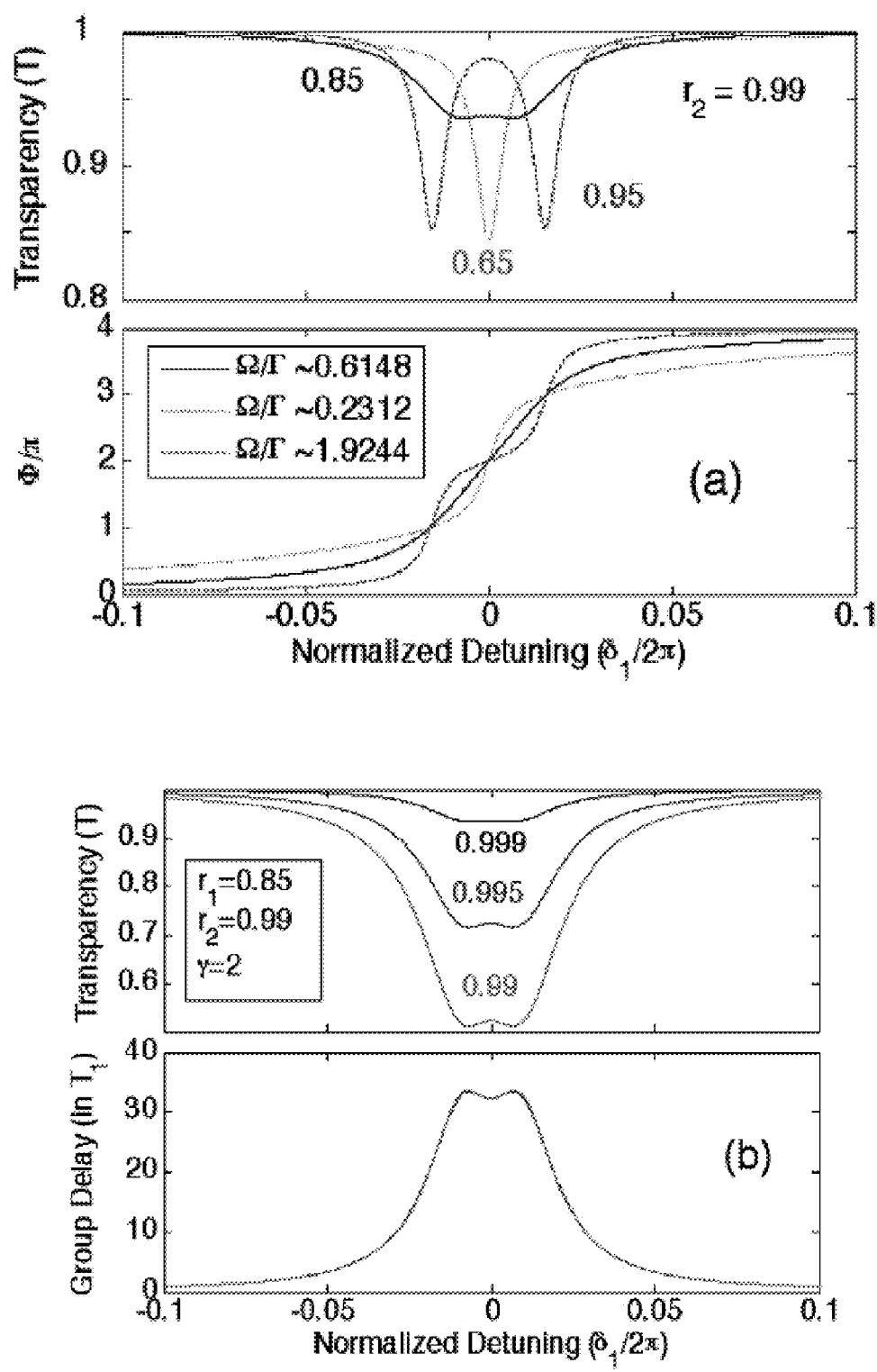
FIG. 5 is graphs of (a) different situations resulting from different values of $r_1$ or splitting-broadening ratio Ω/Γ, and (b) transparency and delay response for different loss parameters.

The result can be verified by the phase response. FIG. 5(a) shows the phase responses and transparencies corresponding to three different regimes of the $\Omega/\Gamma$ ratio. In the splitting-dominant regime (dashed curve), the phase response is split into two $2\pi$ swings. In the broadening-dominant regime (dotted curve), the phase converges to one $2\pi$ swing, similar to that in a one-ring system. Finally, the balanced regime (solid curve) gives a combined phase swing of $4\pi$, meaning that the delay-bandwidth product is about twice that obtained in the one-ring APF scheme, consistent with the analytical prediction based on Equation 10.

$$N_{ST} \sim 4/\pi > 1 \quad (11)$$

The dependence of transparency and delay response on the loss parameters ($a_1$) is shown in FIG. 5(b) for the case $\Omega/\Gamma\sim0.6$. The delay is independent of loss while the transparency decreases with increasing loss. The transmittance is reduced to half with a moderate loss of $a_1=0.99$, but much smaller loss of $a_1=0.999$ has been demonstrated which suggests that a 90% transmittance is possible.

Finally, the buffer can be generalized to more rings to further enhance the delay bandwidth product. With N rings it is the same as an apodized N-ring CROW coupled to one waveguide bus, in which the coupling between the waveguide and the first ring is stronger than those between rings. However, there is a limit to how large N can be. As N increases it will create a photonic bandgap mechanism causing the large delay to be concentrated at the band edges, as happens in the CROW scheme, which reduces the delay-bandwidth product.

Comparing the exemplary buffer with the optical analog of EIT which is based on a similar two-ring configuration. Equation 8 encompasses the EIT case, reducing to Eq. 5 in the limit where $a_2=1$ and $\Delta_2$ approaches 0. To achieve EIT, three conditions must be satisfied:

(i) the splitting is very small ($r_2 \sim 1$),
(ii) ring 2 is in the over-coupling condition ($r_2 < a_2$) in order to have strong interaction between the split resonances, and
(iii) ring 1 is in the under-coupling regime ($r_1 > a_1$) in order to behave like an atom.

As such, the combined condition is $a_1 < r_1 < r_2 < a_2$, so that $\Omega/\Gamma \ll 1$.

Figure 6:
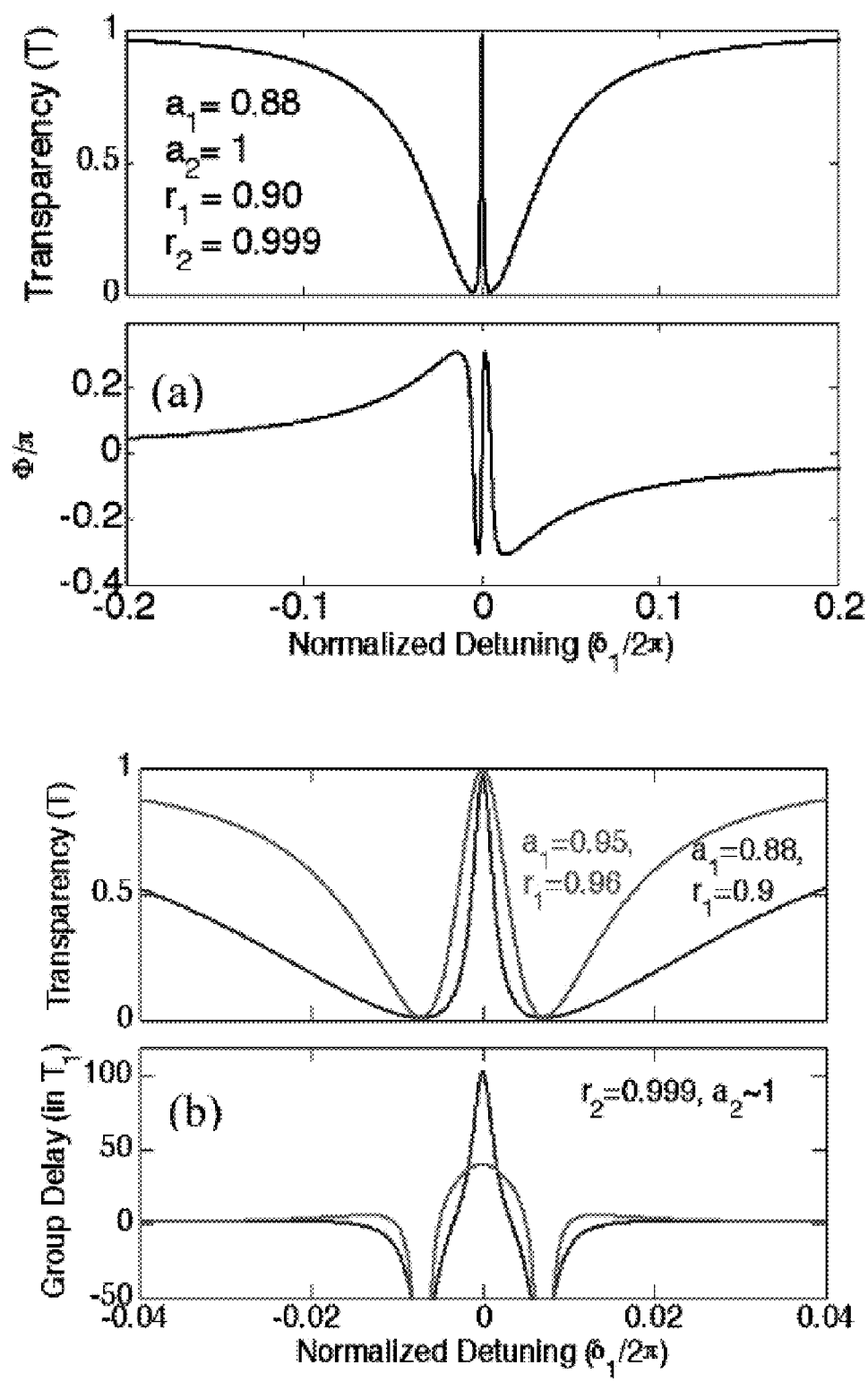
FIG. 6 is graphs of (a) the EIT spectrum, and (b) the transparency and delay for two different EIT parameters.

This condition can only be achieved when the two rings have different loss coefficients (i.e., $a_2 \neq a_1^\gamma$). This requirement complicates the design. More importantly, although the EIT version of the coupled resonator has a large delay, it is not the optimum design for an optical buffer because its delay-bandwidth product is small. FIG. 6(a) shows the EIT spectrum with the parameters: $a_1 = 0.88$, $r_1 = 0.9$, $a_2 = 0.9999$ and $r_2 = 0.999$. Note that the swing in the phase response over the EIT resonance is generally less than $\pi$, implying that the delay bandwidth product of the EIT scheme is smaller, and approximately half the value of the APF scheme:

$$N_{ST} \sim 1/\pi < 1. \quad (12)$$

Compared with Eq. 11, the $N_{ST}$ for the EIT scheme is four times smaller than the exemplary embodiment. The reason for the smaller $N_{ST}$ lies in the under-coupling condition for ring 1 in the EIT scheme, as opposed to over-coupling in the exemplary embodiment. As a result, the phase response in the EIT scheme resembles two closely split under-coupled phase responses from the first ring, connected by a linear and steep phase. The under-coupling phase response is analogous to the index change spectrum associated with a two-level atomic transition. The delay given in this scheme may be large but has a narrow operating bandwidth. FIG. 6(b) shows the delay and transparency for two different EIT cases. The $N_{ST}$ of EIT is numerically calculated to be ~0.3 in agreement with Eq. 12. As a check, the delay-bandwidth product experimentally demonstrated in another EIT configuration based on two rings side-coupled to two waveguide buses, which has a FWHM bandwidth of ~0.13 nm and a delay of 17.9 ps, gives an $N_{ST}$ of ~0.3, which is consistent with theoretical prediction in Eq. 12. This is expected as the delay-bandwidth product for schemes based on the same mechanism should be independent of the specific configuration. Hence, the EIT scheme has a smaller delay bandwidth product than even the APF (one ring) scheme.

Figure 7:
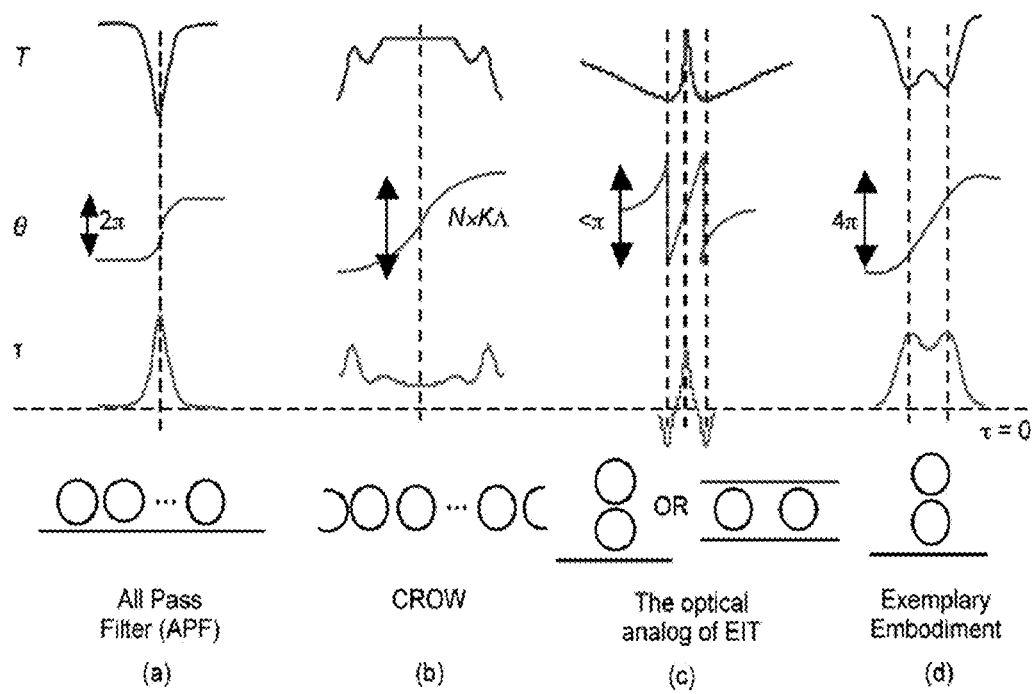
FIG. 7 is graphs of (a) an APF scheme based on one ring coupled to one waveguide bus, (b) The CROW scheme based on coupled resonators, (c) the optical analogue of EIT based on specific conditions in two-ring system and (d) the exemplary embodiment.

For conciseness in FIG. 7 is summarized all the one- and two-resonator buffer schemes considered, with their different signatures in transparency (T), modified round trip phase ($\delta$), and phase response ($\theta$). FIG. 7 is graphs of (a) an APF scheme based on one ring coupled to one waveguide bus, (b) The CROW scheme based on coupled resonators, (c) the optical analogue of EIT based on specific conditions in two-ring system and (d) the exemplary embodiment.

The delay-bandwidth product is a fundamental limitation in any buffering system, and has a different value for different mechanism. The value is fundamentally determined by the phase change across the resonance, thus it is clear that the exemplary embodiment has the largest delay bandwidth product per module.

Figure 8:
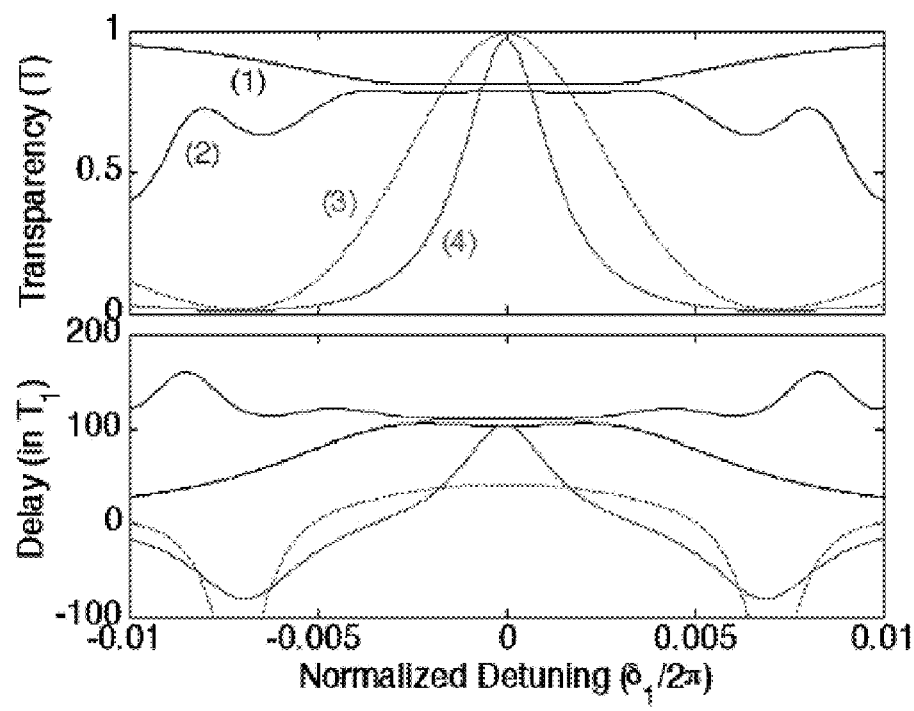
FIG. 8 is graphs of a comparison of transparency and delay between the exemplary embodiment of FIGS. 1 and 3 with $r_1$=0.95 and $r_2$=0.999 with (1) a 10-ring CROW, (2) $r_{WG}$=0.95 and r=0.999; and of the EIT schemes with (3) $r_1$=0.9, $a_1$=0.88 and (4) $r_1$=0.96, $a_1$=0.95.

FIG. 8 is a comparison of transparency and delay, between the exemplary embodiment with $r_1 = 0.95$ and $r_2 = 0.999$ (1), a 10-ring CROW (2) with $r_{WG} = 0.95$ and $r = 0.999$, and the EIT schemes with (3) $r_1 = 0.9$, $a_1 = 0.88$ and (4) $r_1 = 0.96$, $a_1 0.95$. The second ring for the EIT scheme is assumed lossless, for other cases $a = 0.999$.

For both the exemplary embodiment and the 10-ring CROW, the loss of 0.999 is assumed. In the EIT schemes, the losses are those used in FIG. 6(b) with $a_2 \sim 1$. It can be seen that the EIT has the highest transparency but the smallest bandwidth. The exemplary embodiment has the same delay as the EIT and the 10-ring CROW, and about the same bandwidth as the 10-ring CROW. This is a reflection of the fundamental delay-bandwidth product of each system. For the exemplary embodiment, the group delay is $\sim 100 T_1$ and the flat region of the delay has a bandwidth of $\Delta \delta_1/2\pi \sim 7 \times 10^{-3}$. For a ring with a radius of 5 μm and a group effective index of 4.4, these values imply a group delay of ~46 ps and a bandwidth of 15 GHz.

Except for the exemplary embodiment, the delay-bandwidth products for buffers involving resonators are typically less than one, thus a cascade configuration is necessary to buffer more than 1 bit. In Table 1 is summarized the relevant parameters and the performance of three different buffer schemes with N number of modules. For the exemplary embodiment, the N is limited so that the insertion loss is below 10 dB.

TABLE 1

The parameter comparison between three schemes.

| Scheme | Parameters | Insertion Loss (IL) | Normalized Delay ($\tau_D/T_1$) | Normalized Bandwidth ($\Delta\delta_1$) | $N_{ST}$ | N |
|---|---|---|---|---|---|---|
| CROW | $r_{WG} \sim 0.988$, $r_i \sim 0.995$, $a \sim 0.93$* | >30 dB | ~60 | ~$3.2 \times 10^{-2}$ | ~1.92 | 12 |
|  | $r_{WG} = 0.95$, $r_i = 0.999$, $a = 0.999$ | 2.2 dB | ~270 | ~$1.3 \times 10^{-2}$ | ~3.51 | 24 |
| EIT | $r_1 = 0.9$, $r_2 = 0.999$, $a_1 = 0.88$, $a_2 = 0.999$ | 23 dB | ~2200 | ~$2.9 \times 10^{-3}$ | ~6.3 | 24 |
|  | $r_1 = 0.96$, $r_2 = 0.999$, $a_1 = 0.95$, $a_2 = 0.999$ | 11 dB | ~930 | ~$7.8 \times 10^{-3}$ | ~7.4 | 24 |
| Exemplary Embodiment | $r_1 = 0.95$, $r_2 = 0.999$, $a_1 = 0.999$, $a_2 = a_1^2$ | 8 dB | ~830 | ~$1.3 \times 10^{-2}$ | ~10.8 | 8 |
|  | $r_1 = 0.85$, $r_2 = 0.99$, $a_1 = 0.999$, $a_2 = a_1^2$ | 2.9 dB | ~330 | ~$4.3 \times 10^{-2}$ | ~14 | 10 |

*The parameters are the adjustment of: $|K_{WG}| = 0.15$, $|K_i| = 0.1$, loss = 17 dB/cm, R = 60 μm, and $\pi n R/c \sim 0.9182 \times 10^{-12}$ In the first scheme, the CROW configurations have been discussed in the Introduction, where it is mentioned that the apodized configuration ($r_{WG} = 0.95$, $r = 0.999$) can have a flat spectrum with a small insertion loss of ~2 dB for 24 modules. The $N_{ST}$ for this case is about 3.51, consistent with the value given by $N_{ST} = N/2\pi$. Although $N_{ST}$ tends to be lower for CROW, the advantage of CROW is the low higher order dispersion, as long as the operating bandwidth is far from the edges of the CROW transmission band where higher order dispersion is dominant. In the EIT scheme, a cascade of four modules is necessary to buffer 1 bit. It should also be noted that the second ring in reality is not lossless, thus there is insertion loss in the cascade EIT configuration. If $a_2 = 0.999$, the transparency per module would be ~0.8 for $a_1 = 0.88$ and $r_1 = 0.9$, which means a cascade of 24 modules would have an insertion loss (IL) of 10 log(0.8)$^{24}$~23 dB. Similarly, the case of $a_1 = 0.95$ and $r_1 = 0.96$ would correspond to a transparency of ~0.9 and an insertion loss of ~11 dB for 24 modules. Finally, for the exemplary embodiment, two cases are presented. In the case with very weak inter-resonator coupling ($r_2$=0.999) there is an insertion loss of 8 dB for an 8-module structure, and in the case with stronger inter-resonator coupling ($r_2$=0.99) there is IL=2.9 dB for a 10-module structure. The $N_{ST}$ for both cases are 10.8 and 14. The insertion loss is reasonably low for such a large delay-bandwidth product.

Figure 9:
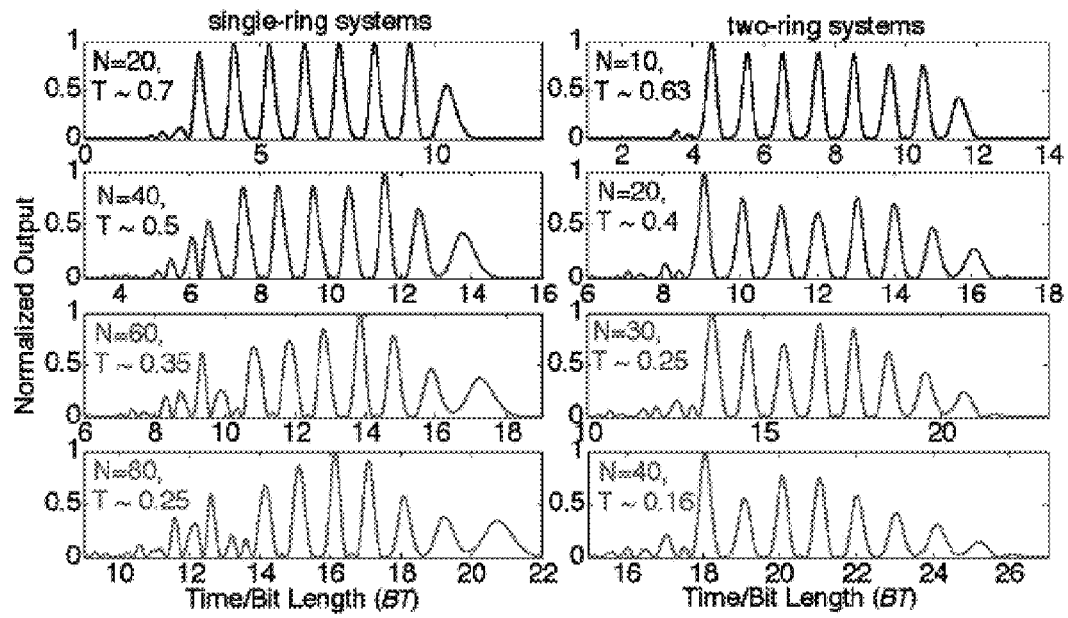
FIG. 9 is graphs of (a) side-by-side comparison of propagation of bits in different structure lengths, and (b) comparison between the exemplary embodiment of FIGS. 1 and 3, APF, and CROW in a fixed 4(8) buffered RZ (NRZ) bits.
Figure 9:
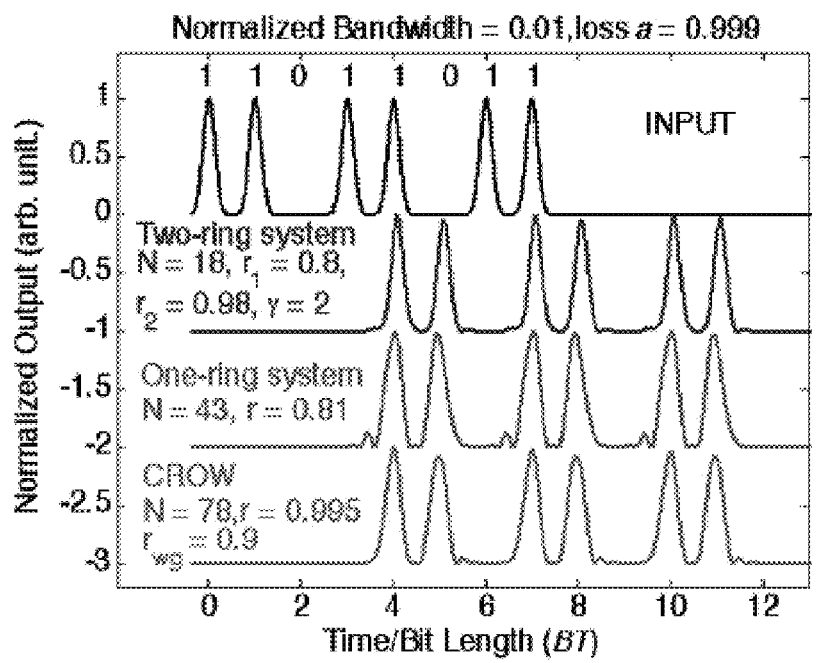

FIG. 9(a) shows a side-by-side comparison of the signal propagation between a single-ring (the APF scheme) and a two-ring (the exemplary embodiment) cascade structures, with the same coupling parameters and for different number of rings in each case. In order to show the inter-symbol interference, 8 return-to-zero (RZ) bits of logic 1 are inserted and plot the time domain results with the time normalized to the bit length. The APF starts to show symbol ambiguity when N>40 with ~6 buffered bits, whereas the exemplary embodiment starts to have inter-symbol interference only when there are more than 60 rings in the structure (N>30) with ~14 buffered bits. Clearly this shows that the exemplary embodiment, due to its flatter delay spectrum, is more immune to high-order dispersion and can store twice the number of undistorted bits compared to the APF. The spectrum of the two-ring structure can be mimicked by a cascade of two APF modules with "detuned resonances" to double the 3-dB bandwidth while keeping the same delay. If the resultant spectrum is flat, then this configuration should be equally immune to inter-symbol interference while having the same $N_{ST}$ as the exemplary embodiment. However, the main challenge for this configuration is the practical difficulty in achieving the desired detuning in a controlled manner. The resonance shift is not linear but rather random for very small size detunings of less than 1% and high resonance order of the order of 100 (corresponding to a ring radius of 10 μm) because of the Vernier effect. In contrast, it is easier to achieve the $\Omega/\Gamma$=0.6 condition required for the proposed two-ring, one-waveguide buffer as illustrated by FIG. 4(b). Thus, the features of the two cascade APF modules above are not the same as the features offered by the two-ring system of the exemplary embodiment.

Finally, the exemplary embodiment is compared with APF and CROW in their ability to buffer a fixed number of bits. Here, the operating bandwidth is chosen to be smaller than the 3 dB bandwidth to avoid inter-symbol interference and the coupling coefficients for each scheme are freely chosen to achieve the same undistorted buffering of 4 RZ bits. To minimize distortion, the usable bandwidth is defined as half the FWHM bandwidth and therefore $N_{ST}$ for the undistorted bit is half the values previously defined. In the case of CROW, the usable bandwidth is defined as half the frequency band between the two band edges. The time domain results for the APF, CROW, and the exemplary embodiment are shown in FIG. 9(b). It is seen that in each, a different number of modules (N) is required to buffer the same 4 bits, and the ratio of modules, 18:43:78, is in agreement with the ratio of their delay-bandwidth products, 1:2.38:4.33. As such, both frequency and time domain analyses show that the exemplary embodiment is 2 and 4 times more compact than the APF and the CROW structure, respectively. Similarly, it should also be 4 times more compact compared with the EIT scheme.

There is disclosed a buffer based on indistinguishable split resonances in a two-ring structure. The delay bandwidth product, which is the fundamental parameter for optical buffer, is shown to be higher than other schemes such as the cascaded side-coupled ring structure (APF), the coupled resonator optical waveguide (CROW), and the optical analog of EIT. The delay and transparency spectra are reasonably flat and the insertion loss for realistic parameters is quite low, which are all sought-after features in optical buffering. Time-domain simulations of signal propagation through long cascaded modular structures also show superior performance in buffering higher number of bits for the exemplary embodiment compared with APF and other schemes.

Whilst the foregoing description has described exemplary embodiments, it will be understood by those skilled in the technology concerned that many variations in details of design, construction and/or operation may be made without departing from the present invention.

The invention claimed is:

1. A two-ring optical buffer comprising a first ring operatively connected to a waveguide and a second ring, the second ring being operatively connected to only the first ring, the second ring and the first ring having a circumferential ratio substantially equal to $2^m$, where m is an integer.

2. A two-ring optical buffer comprising a first ring operatively connected to a waveguide and a second ring, the second ring being operatively connected to only the first ring, a ratio of resonance splitting over resonance broadening being approximately 0.6.

3. A two-ring optical buffer as claimed in claim 1, wherein a ratio of resonance splitting over resonance broadening is approximately 0.6.

4. A two-ring optical buffer as claimed in claim 2, wherein resonance splitting is controllable by the coupling length of the first ring and the second ring.

5. A two-ring optical buffer as claimed in claim 3, wherein resonance splitting is controllable by the coupling length of the first ring and the second ring.

6. A two-ring optical buffer as claimed in claim 2, wherein resonance broadening is controllable by a coupling length of the first ring and the optical waveguide.

7. A two-ring optical buffer as claimed in claim 3, wherein resonance broadening is controllable by a coupling length of the first ring and the optical waveguide.

8. A two-ring optical buffer as claimed in claim 1, wherein the two-ring optical buffer comprises indistinguishable split resonances in the first ring and the second ring.

9. A two-ring optical buffer as claimed in claim 2, wherein the two-ring optical buffer comprises indistinguishable split resonances in the first ring and the second ring.

10. A two-ring optical buffer as claimed in claim 2, wherein the resonance splitting and the resonance broadening are able to be independently controlled without changing or effecting other parameters.

11. A two-ring optical buffer as claimed in claim 3, wherein the resonance splitting and the resonance broadening are able to be independently controlled without changing or effecting other parameters.

12. A two-ring optical buffer as claimed in claim 1, wherein a delay induced by the two-ring optical buffer is independent of the circumferential ratio.

13. A two-ring optical buffer as claimed in claim 2, wherein a delay induced by the two-ring optical buffer is independent of the circumferential ratio.

14. A two-ring optical buffer as claimed in claim 1, wherein a coupling length of the first ring and the wave guide controls resonance broadening.

15. A two-ring optical buffer as claimed in claim 1, wherein a coupling length of the first ring and the second ring controls resonance splitting.

16. A two-ring optical buffer comprising a first ring operatively connected to a waveguide and a second ring, the second ring being operatively connected to only the first ring, the second ring and the first ring having a circumferential ratio substantially equal to $2^m$, where m is an integer; a ratio of resonance splitting over resonance broadening is approximately 0.6; resonance broadening being controllable by a coupling length of the first ring and the wave guide and resonance splitting is controllable by a coupling length of the first ring and the second ring; the resonance splitting and the resonance broadening being able to be independently controlled without changing or effecting other parameters; and a delay induced by the two-ring optical buffer is independent of the circumferential ratio.

* * * * *